(12) United States Patent
Badihi

(10) Patent No.: US 11,719,903 B2
(45) Date of Patent: Aug. 8, 2023

(54) SYSTEMS, METHODS, AND DEVICES FOR ASSEMBLING LENSES AND WAVEGUIDES

(71) Applicant: MELLANOX TECHNOLOGIES, LTD., Yokneam (IL)

(72) Inventor: Avner Badihi, Nataf (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 212 days.

(21) Appl. No.: 17/194,582

(22) Filed: Mar. 8, 2021

(65) Prior Publication Data

US 2022/0283398 A1 Sep. 8, 2022

(51) Int. Cl.
| | |
|---|---|
| *G02B 7/00* | (2021.01) |
| *G02B 7/02* | (2021.01) |
| *G02B 27/30* | (2006.01) |
| *B29C 65/00* | (2006.01) |
| *B29D 11/00* | (2006.01) |
| *B29C 65/48* | (2006.01) |
| *G02B 6/26* | (2006.01) |

(52) U.S. Cl.
CPC .......... *G02B 7/003* (2013.01); *B29C 65/4845* (2013.01); *B29C 66/73365* (2013.01); *B29D 11/00692* (2013.01); *G02B 6/262* (2013.01); *G02B 7/021* (2013.01); *G02B 27/30* (2013.01)

(58) Field of Classification Search
CPC .......... B29C 65/4845; B29C 66/73365; B29D 11/00692; G02B 6/262; G02B 7/021; G02B 7/003; G02B 27/30
See application file for complete search history.

(56) References Cited

U.S. PATENT DOCUMENTS

| | | | | |
|---|---|---|---|---|
| 4,735,677 | A * | 4/1988 | Kawachi | G02B 6/4246 438/31 |
| 8,346,037 | B2 * | 1/2013 | Pezeshki | G02B 6/4207 385/35 |
| 8,554,026 | B2 * | 10/2013 | Chang | G02B 6/43 385/38 |
| 8,768,119 | B2 * | 7/2014 | Pezeshki | G02B 6/4214 385/35 |
| 8,768,120 | B2 * | 7/2014 | Pezeshki | G02B 6/4249 385/35 |
| 9,229,169 | B2 * | 1/2016 | Doany | H01L 21/302 |
| 9,335,481 | B2 * | 5/2016 | Pezeshki | G02B 6/4249 |
| 9,405,072 | B2 * | 8/2016 | Pezeshki | G02B 6/32 |
| 9,568,679 | B2 * | 2/2017 | Doany | G02B 6/32 |
| 9,726,836 | B2 * | 8/2017 | Pezeshki | G02B 6/4214 |
| 10,054,748 | B2 * | 8/2018 | Pezeshki | G02B 6/4207 |
| 10,884,216 | B2 * | 1/2021 | Kodera | G02B 6/4225 |
| 10,996,466 | B2 * | 5/2021 | Amirsolaimani | G02B 3/04 |
| 11,303,357 | B1 * | 4/2022 | Badihi | H04B 10/25 |

(Continued)

*Primary Examiner* — Andrew Jordan
(74) *Attorney, Agent, or Firm* — Sheridan Ross P.C.

(57) ABSTRACT

A system comprises a first mechanism configured to hold a first block including a plurality of lenses located on or near a first surface of the first block. The plurality of lenses are configured to receive light to generate a plurality of light spots at or near a second surface of the first block opposite the first surface. The system includes a second mechanism configured to hold a second block including a plurality of waveguides, and to move the second block to bring the plurality of waveguides in alignment with the plurality of lenses using the plurality of light spots as alignment marks.

21 Claims, 10 Drawing Sheets

(56) References Cited

U.S. PATENT DOCUMENTS

| | | | |
|---|---|---|---|
| 11,422,321 B2 * | 8/2022 | Yanagihara | G02B 6/428 |
| 2004/0028348 A1 * | 2/2004 | Cote | G02B 6/4225 |
| | | | 385/88 |
| 2011/0013869 A1 * | 1/2011 | Pezeshki | G02B 6/4257 |
| | | | 385/33 |
| 2011/0164849 A1 * | 7/2011 | Rogers | G02B 6/30 |
| | | | 29/830 |
| 2011/0235967 A1 * | 9/2011 | Chang | G02B 6/43 |
| | | | 385/27 |
| 2012/0099820 A1 * | 4/2012 | Rolston | G02B 6/4249 |
| | | | 385/59 |
| 2013/0084039 A1 * | 4/2013 | Doany | H01L 21/302 |
| | | | 438/31 |
| 2013/0160266 A1 * | 6/2013 | Pezeshki | G02B 6/4244 |
| | | | 29/407.09 |
| 2013/0163252 A1 * | 6/2013 | Pezeshki | G02B 6/4214 |
| | | | 362/311.1 |
| 2014/0308007 A1 * | 10/2014 | Pezeshki | G02B 6/4244 |
| | | | 385/52 |
| 2015/0331207 A1 * | 11/2015 | Pezeshki | G02B 6/32 |
| | | | 385/33 |
| 2016/0231522 A1 * | 8/2016 | Shi | G02B 6/4204 |
| 2016/0252687 A1 * | 9/2016 | Badihi | G02B 6/423 |
| | | | 385/14 |
| 2016/0313518 A1 * | 10/2016 | Pezeshki | G02B 6/4214 |
| 2017/0003453 A1 * | 1/2017 | Doany | G02B 6/32 |
| 2017/0068056 A1 * | 3/2017 | Gappa | G02B 6/422 |
| 2018/0067271 A1 * | 3/2018 | Pezeshki | G02B 6/4249 |
| 2020/0057215 A1 * | 2/2020 | Pezeshki | G02B 6/4257 |
| 2022/0283398 A1 * | 9/2022 | Badihi | G02B 6/3853 |

* cited by examiner

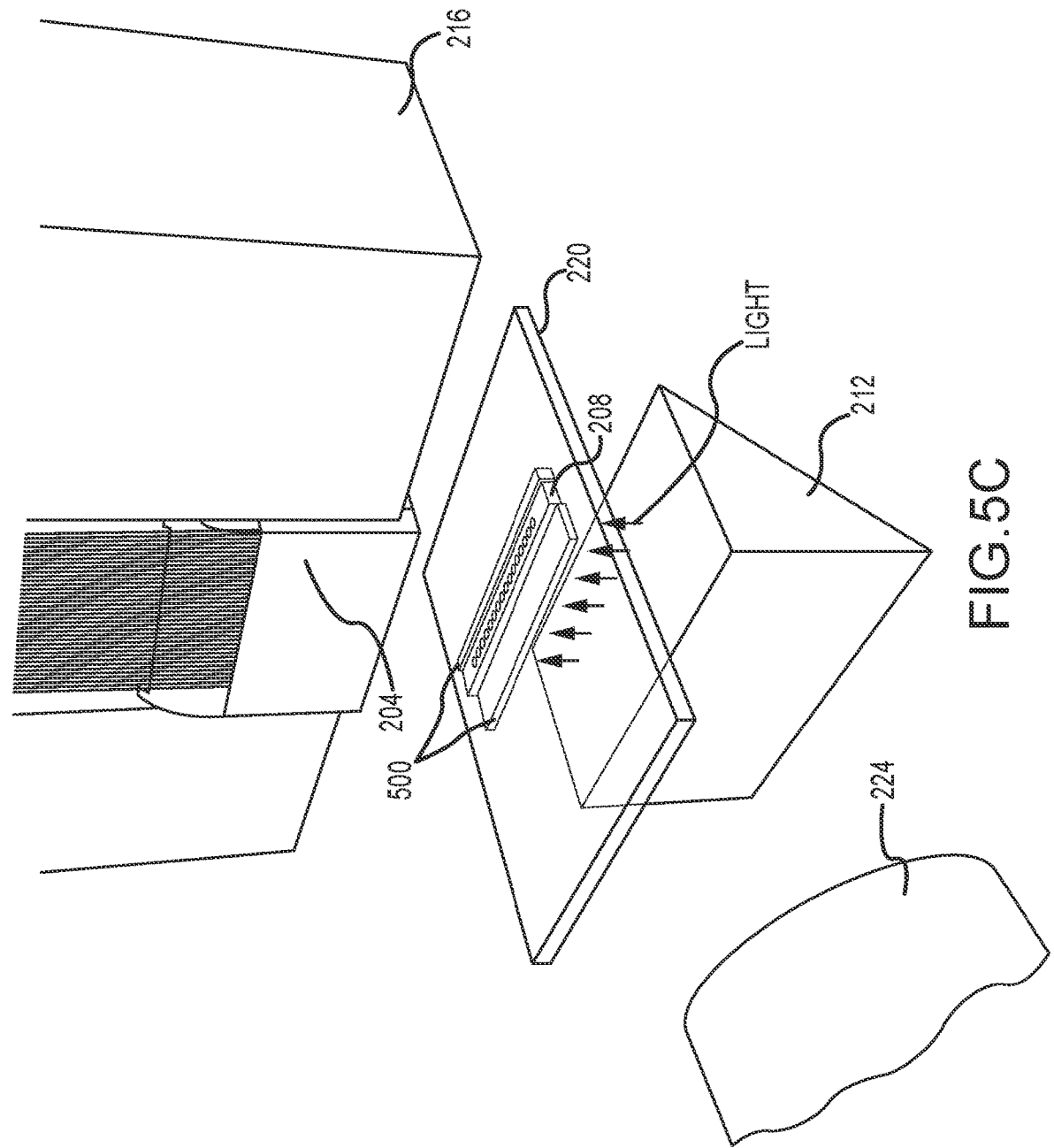

SYSTEMS, METHODS, AND DEVICES FOR ASSEMBLING LENSES AND WAVEGUIDES

FIELD OF THE DISCLOSURE

Example embodiments are generally directed to systems, methods, and devices for assembling lenses and waveguides.

BACKGROUND

Waveguides are employed in data transmission systems to achieve high-speed transmission. One factor that impacts performance of these systems is the quality of alignment between waveguides and lenses of a collimator that carries the optical signals to and/or from a destination/source device.

BRIEF SUMMARY

In an illustrative embodiment, a system comprises a first mechanism configured to hold a first block including a plurality of lenses located on or near a first surface of the first block. The plurality of lenses are configured to receive light to generate a plurality of light spots at or near a second surface of the first block opposite the first surface. The system includes a second mechanism configured to hold a second block including a plurality of waveguides, and to move the second block to bring the plurality of waveguides in alignment with the plurality of lenses using the plurality of light spots as alignment marks.

In an illustrative embodiment, a method comprises irradiating a lens block including a plurality of lenses with light to produce a plurality of light spots, bringing a plurality of waveguides of a fiber block in alignment with the plurality of light spots, moving the fiber block to contact the lens block according to the alignment, and adhering the fiber block to the lens block to form a collimator where each waveguide of the fiber block is aligned with a corresponding lens of the lens block.

In an illustrative embodiment, a system comprises a transparent substrate configured to hold a lens block including a plurality of lenses located at a first surface of the lens block, a light source configured to emit collimated light that causes the lens block to produce a plurality of light spots at a second surface of the lens block opposite the first surface, a fiber block including a plurality of waveguides, and an alignment apparatus configured to align the plurality of waveguides with the plurality of lenses using the plurality of light spots.

Additional features and advantages are described herein and will be apparent from the following description and the figures.

BRIEF DESCRIPTION OF THE DRAWINGS

The present disclosure is described in conjunction with the appended figures, which are not necessarily drawn to scale:

FIGS. 5A to 5E illustrate various views of an example implementation of the system from FIG. 4 according to at least one example embodiment.

DETAILED DESCRIPTION

Figure 1:
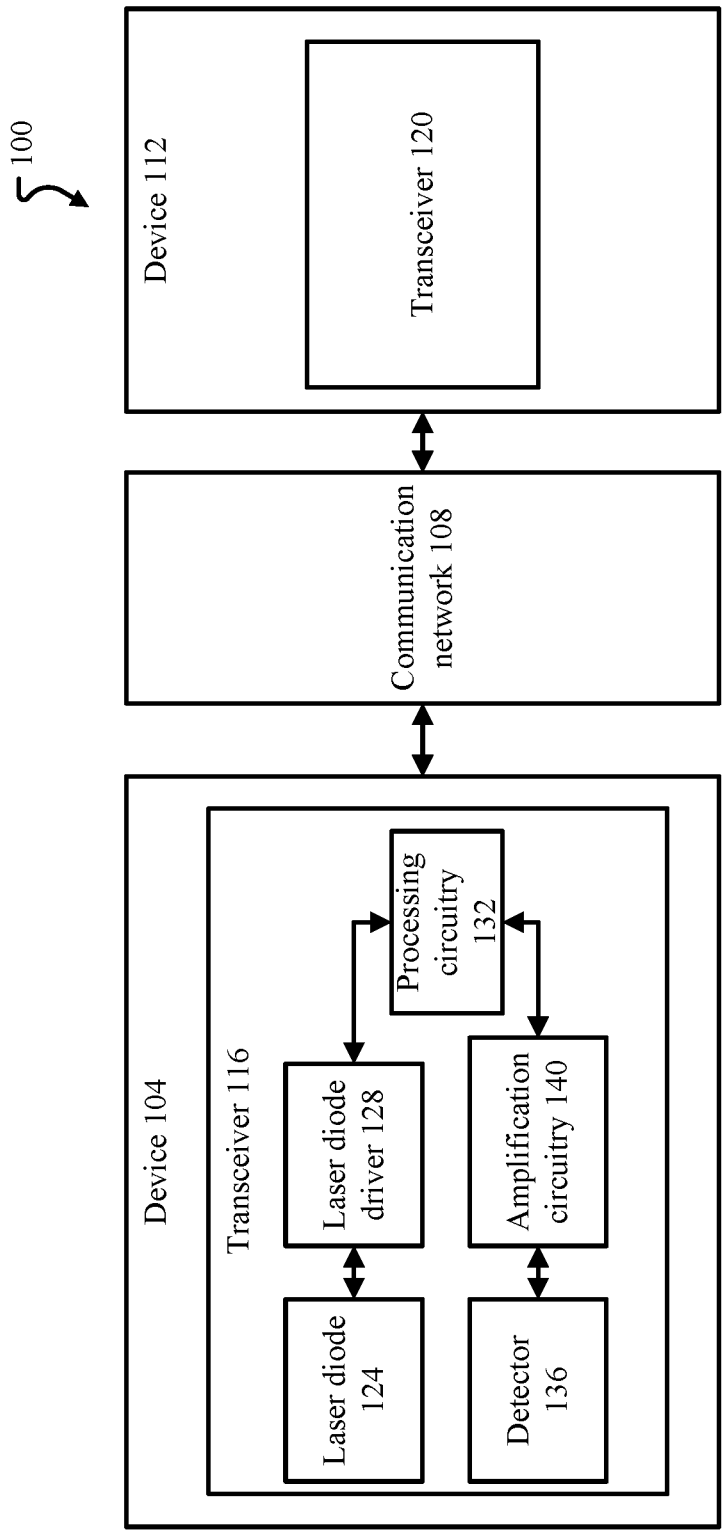
FIG. 1 illustrates an optical system according to at least one example embodiment.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Example embodiments are directed toward a system for aligning a lens block including lenses with a fiber block including waveguides. The system includes a first mechanism to hold the lens block, a second mechanism to hold and move the fiber block, and a light source that emits collimated light through the lenses of the lens block to create light spots. The second mechanism aligns the waveguides on the fiber block with the light spots and moves the fiber block to contact the lens block. The lens block is then adhered to the fiber block with an adhesive to form a complete collimator where each waveguide is aligned with a corresponding lens.

Related art processes for aligning a fiber array or fiber block to an array of lenses to yield a perfect or near perfect collimated beam are complex, which results in a relatively high cost for collimator arrays. The lens array surface that will be bonded to the waveguides generally does not have effective fiducials aligned to the lenses. Thus, the accurate alignment of the lenses to the waveguide array is lacking the accurate positions and fiducials which are useful for completing accurate alignment.

Inventive concepts provide an alignment tool that allows a simple a quick alignment of a waveguide array and a lens array to form a complete collimator. The alignment tool may form an array of light fiducials according to the foci of the lenses in the lens array. These light fiducials can be aligned to the waveguide array with high accuracy. Thus, the alignment system produces a complete collimator that includes an array of optical components corresponding to an array of single mode waveguides or fibers spaced accurately on a substrate—either formed on the substrate, or attached to a fiber block (e.g., using a V-Groove array, ferrule, or other known attachment technique). The waveguide array (or fiber block) is joined with an array of lenses that collimate/focus the light going out of/into each individual fiber of the array to produce an array of collimated light beams.

Each lens optically couples with an extremity of a fiber of the fiber block, yielding a collimated light beam that is co-linear with the waveguide, with little divergence. Divergence of a light beam may be defined as an angle away from perfectly parallel beam of light. A high-quality collimator according to example embodiments has a divergence on the order of 0.1-0.2 degrees.

In at least one example embodiment, an array of micro lenses is aligned to a set of single mode waveguides/fibers in order to provide efficient coupling of the lenses to the waveguide inputs/outputs and form an array of collimated light beams output from the micro lens array.

An alignment system according to example embodiments optically couples each lens to an extremity of a corresponding waveguide with low insertion loss and provides a path for collimated light beams. In general, the system includes a lens array chip with lenses, a right-angle prism or mirror, and a vacuum holder for the fiber block. The lens array chip (or lens block) rests on a transparent (e.g., glass) plate and is held in place by a clamp. The lens array lies face down on the glass plate, and a light source illuminates the lens array with collimated light through the glass plate. The collimated light is focused by the lenses in the lens array, yielding an array of light spots on the back surface of the lens array, which are the foci of the lenses in the lens array. That is, the parallel light from the light source couples with the lenses on the lens array chip and exits at the focal point of each lens. During an alignment process, edges of the waveguides are aligned with the light spots. Thus, the light spots are used as alignment marks to accurately align and couple the fiber block and the lens array chip.

The alignment system may include a vacuum holder that holds the fiber block with the waveguides during the alignment. The vacuum holder may be designed for a commercial flip-chip alignment machine. A vacuum hose couples the holder to the machine, and the vacuum hose center may be aligned with the center longitudinal axis of the fiber block. In addition to the vacuum holding the fiber block, a mechanical clamp may be added to hold the fiber block in place against lateral forces. In addition, the clamp or other device may hold loose fibers of the fiber block during alignment.

At least one example embodiment employs a commercial flip chip alignment system (e.g., manufactured by Finetech (GMBH); model: FINEPLACER® lambda, Flexible Submicron Die Bonder). The fiber block will be aligned to the lens array chip with a flip chip process using light spots by overlapping each light spot with a center of a corresponding waveguide's core.

The fiber block is then lowered toward the lens array chip, while adhesive is applied to the lens array chip surface. Applying light pressure presses the fiber block downwards on the lens array chip, and the pressure is increased to squeeze the adhesive to a thin layer. The adhesive is cured using, for example ultraviolet light, and a complete collimator with lenses and waveguides is formed.

FIG. 1 illustrates an optical system 100 according to at least one example embodiment. The optical system 100 includes a device 104, a communication network 108, and a device 112. In at least one example embodiment, devices 104 and 112 correspond to one or more of a Personal Computer (PC), a laptop, a tablet, a smartphone, a server, a collection of servers, or the like. In some embodiments, the devices 104 and 112 may correspond to any appropriate type of device that communicates with other devices also connected to a common type of communication network 108. As another specific but non-limiting example, the devices 104 and 112 may correspond to servers offering information resources, services and/or applications to user devices, client devices, or other hosts in the system 100.

Examples of the communication network 108 that may be used to connect the devices 104 and 112 include an Internet Protocol (IP) network, an Ethernet network, an InfiniBand (TB) network, a Fibre Channel network, the Internet, a cellular communication network, a wireless communication network, combinations thereof (E.g., Fibre Channel over Ethernet), variants thereof, and/or the like. In one specific, but non-limiting example, the communication network 108 is a network that enables data transmission between the devices 104 and 112 using optical signals. In this case, the devices 104 and 112 and the communication network 108 may include waveguides (e.g., optical fibers) that carry the optical signals. As discussed in more detail below, example embodiments relate to aligning the waveguides of the devices 104 and 112 with respective collimators to enable communication over the communication network 108.

The device 104 includes a transceiver 116 for sending and receiving optical signals. The optical signals may be modulated with data. In at least one example embodiment, a silicon photonics (SiP) fiber block may include all or some of the elements of the transceiver 116. As discussed in more detail below, the SiP fiber block may include waveguides that carry the optical signals, and the waveguides should be accurately aligned with a collimator so that light passing through a waveguide also passes through a corresponding lens of the collimator.

The device 112 may include a transceiver 120 for sending and receiving optical signals modulated with data. The same or similar structure of the transceiver 116 may be applied to transceiver 120, and thus, the structure of transceiver 120 is not described separately.

Still with reference to FIG. 1, the transceiver 116 includes a light emitting portion or light source for generating optical signals, such as a laser diode 124. The laser diode 124 may be a single laser diode or an array of diodes depending on design preferences. The transceiver 116 further includes a driver for the light emitting portions, such as laser diode driver 128, which may include appropriate driving circuitry for causing the laser diode 124 to emit light (e.g., modulated light) or drive a light modulator built into the Silicon Photonics portion of the transceiver under control of the processing circuitry 132. The transceiver 116 may further include processing circuitry 132, amplification circuitry 140, and detector 136. Here, it should be appreciated that the laser diode 124 and laser diode driver 128 are elements associated with transmission capabilities of the transceiver 116, while the detector 136 and the amplification circuitry 140 are elements associated with receive capabilities of the transceiver 116.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application specific integrated circuit (ASIC). Other non-limiting examples of the processing circuitry 132 include an Integrated Circuit (IC) fiber block, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control overall operation of the transceiver 116.

The detector 136 may comprise an optical detector for detecting optical signal. For example, the detector 136 may include one or more photodiodes or other photosensor(s) (e.g., phototransistors, avalanche photodiodes, and/or the like) for converting incident light into electrical signals. In at least one example embodiment, the detector 136 may comprise a plurality of photosensors in an array, where each photosensor is associated with a pixel in the array.

The amplification circuitry 140 may comprise circuitry for amplifying the electrical signals output from the detector 136 to ensure the processing circuitry 132 receives the electrical signals with sufficient amplitude. A specific, but non-limiting, example of the amplification circuitry 140 is one or more transimpedance amplifiers (TIAs). Additionally or alternatively, other suitable amplification circuitry generally known in the art may also be employed.

Although not explicitly shown, it should be appreciated that devices 104 and 112 may include other processing devices, storage devices, and/or communication interfaces generally associated with computing tasks, such as sending and receiving data.

Figure 2A:
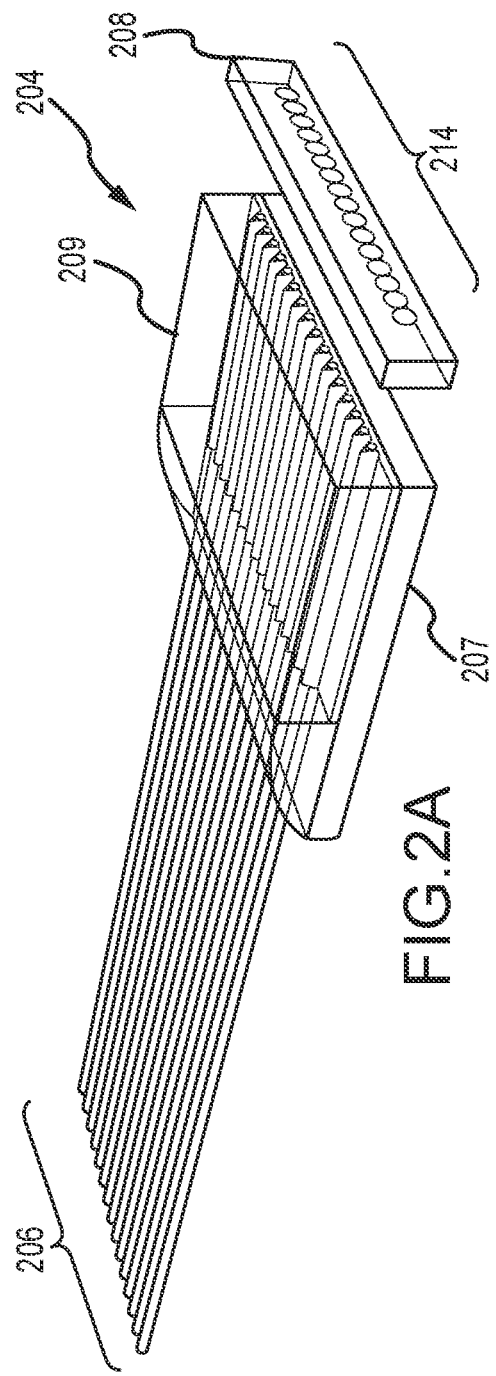
FIGS. 2A and 2B illustrate disassembled and assembled views of a fiber block and a lens block according to at least one example embodiment.
Figure 2B:
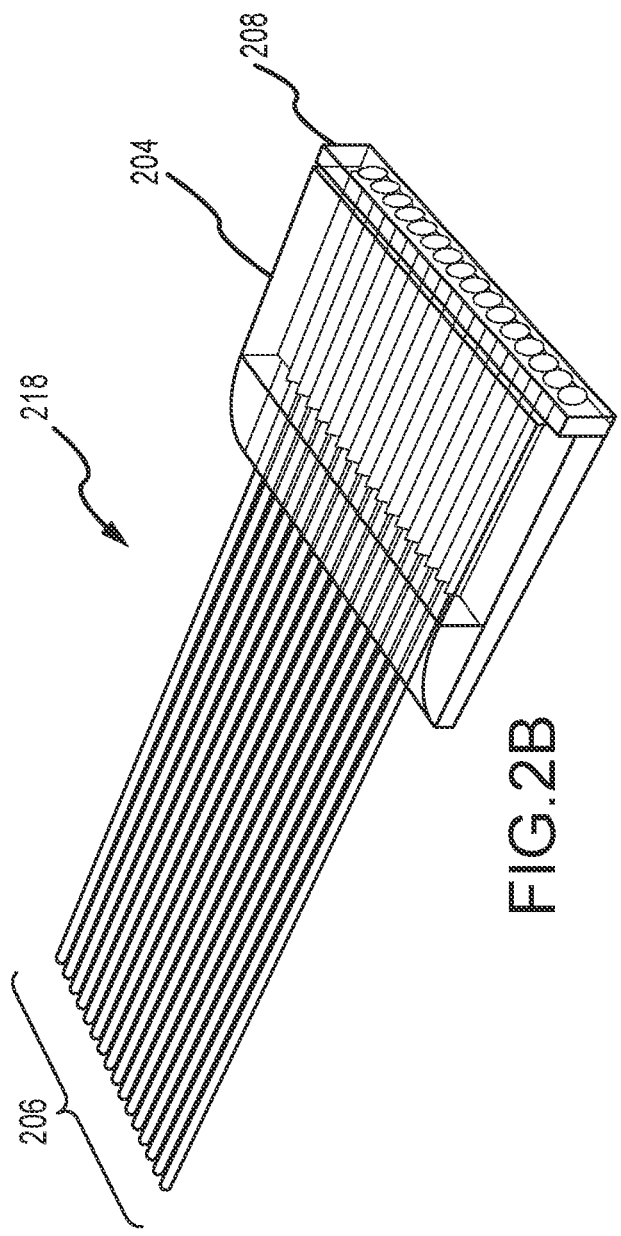

FIGS. 2A and 2B illustrate disassembled and assembled views of a fiber block 204 and a lens block 208 according to at least one example embodiment. When the fiber block 204 and the lens block 208 are assembled the combined structure may be referred to as a collimator 218 (a collimator array, or a single mode fiber (SMF) collimator array). The assembled collimator 218 may be employed in one or more devices in the system 100 of FIG. 1 to assist with data transmission using optical signals.

The fiber block 204 may include a plurality of waveguides 206 mounted to or formed on a substrate 207 and covered by a housing 209 at one end of the plurality of waveguides 206. The plurality of waveguides 206 may be formed on or mounted to the substrate 207 according to any suitable method, which may include using V-shaped grooves in the substrate 207 and/or the housing 209 or using ferrules. Ends of the plurality of waveguides 206 in the fiber block 204 may be spaced apart at regular or irregular intervals and flush with or nearly flush with end surfaces of the substrate 207 and/or the housing 209. It should be appreciated that the housing 209 is shown as being transparent for the sake of illustration, and that the housing 209 may be formed of any suitable opaque material, such as a plastic, polymer, silicon, etc.

The lens block 208 includes a plurality of lenses 214 formed at or on a surface of the lens block 208. The lens block 208 may comprise a substrate material, such as silicon or other suitable material that can pass light within a desired wavelength range to and from the lenses 214. In at least one example embodiment, the lens block 208 and each lens 214 are transparent to the light in the wavelength range used. The plurality of lenses 214 may be formed on the lens block 208 according to any suitable process. For example, the lenses 214 may be formed separately and then mounted to the lens block 208, or the plurality of lenses 214 may be formed by etching the lens block 208 so that the lenses 214 are integrated with the lens block 208. The plurality of lenses 214 may be spaced apart from one another at regular intervals on a first surface of the lens block 208, for example, at substantially the same intervals as the waveguides 206 so that each lens 214 corresponds to a waveguide 206 in the assembled collimator 218.

Figure 3A:
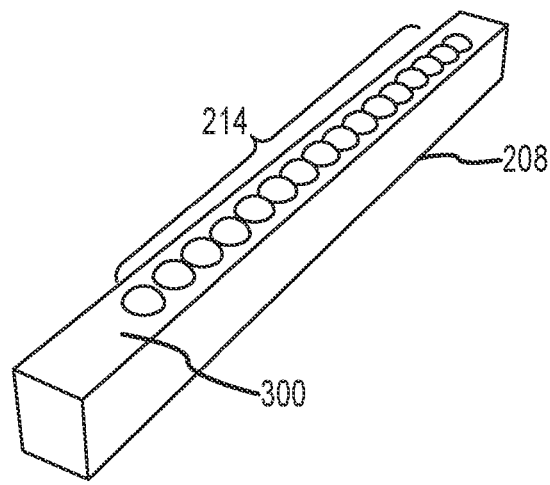
FIGS. 3A to 3C illustrate the lens block from FIGS. 2A and 2B in more detail.
Figure 3B:
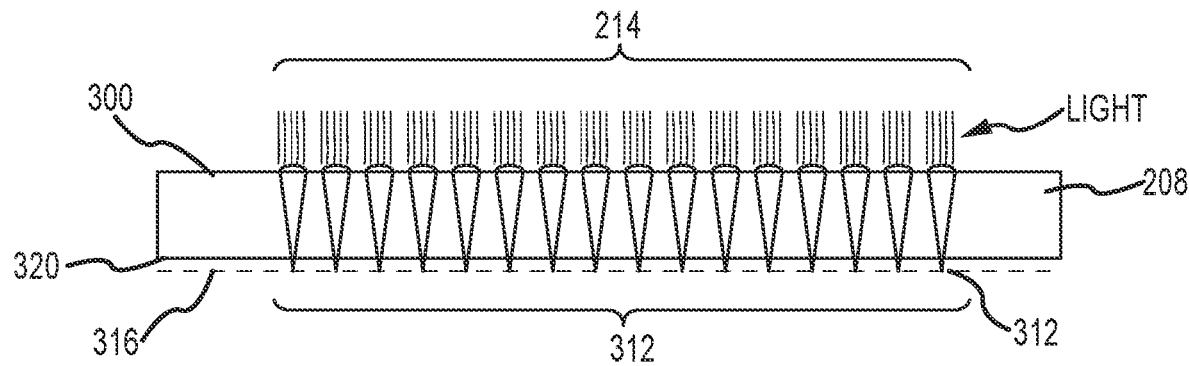
Figure 3C:
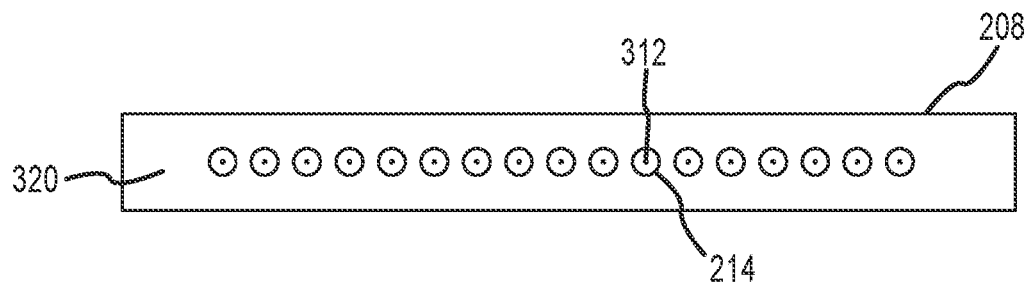

FIGS. 3A to 3C illustrate the lens block 204 from FIGS. 2A and 2B in more detail.

FIG. 3A illustrates a perspective view of the lens block 208 where the lenses 214 are formed from or on a surface 300 of the lens block 208.

FIG. 3B illustrates a cross sectional view of the lens block 208 from FIG. 3A, and FIG. 3C illustrates bottom plan view of the lens block 208. The plurality of lenses 214 have a substantially same focal length so that each lens focuses light incident to the surface 300 to a same focal point. During the alignment process, light incident to the lenses 214 causes a plurality of light spots 312 to exist at a substantially same plane 316 that is substantially parallel to a surface 320 of the lens block 208. In the example of FIG. 3B, the plane 316 is spaced apart from the surface 320 of the lens block 208. However, example embodiments are not limited thereto, and properties of the lenses 214 may be adjusted to move the focal point of one or more lenses closer to or further away from the surface 320 according to design preferences for the final collimator 218.

FIG. 3B illustrates how each light spot 312 is generated at a substantially same plane 316 near the surface 320 of the lens block 208, and FIG. 3C illustrates how each light spot 312 at a substantially exact center of a corresponding lens 214. That is, each light spot 312 is centered along the optical axis of a corresponding lens 214. These light spots 312 may be used to assist with aligning the lens block 208 and the fiber block 204 during an alignment process, described in more detail below.

Example embodiments related to a process that aligns the fiber block 204 and the lens block 208 will now be discussed.

Figure 4:
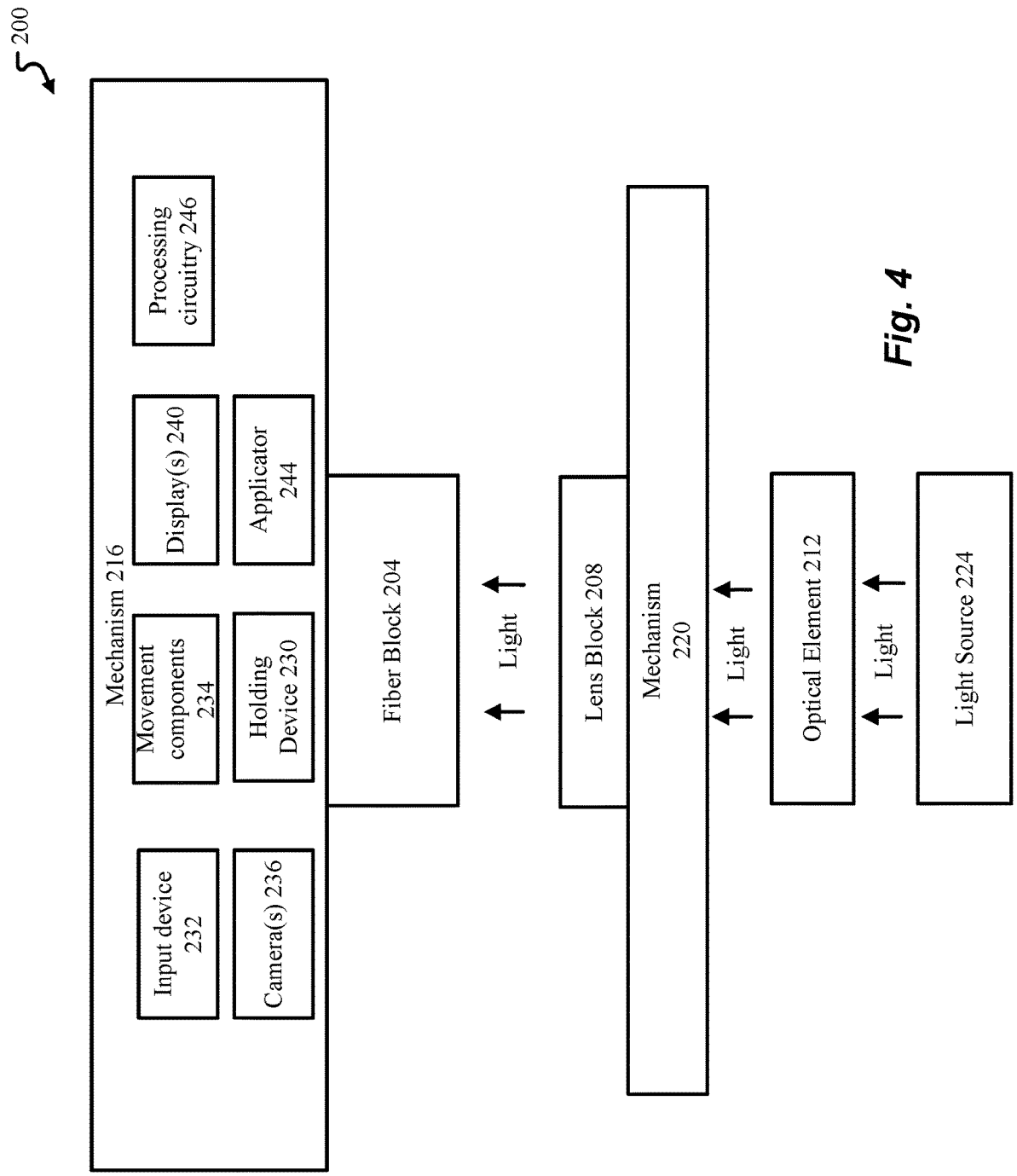
FIG. 4 is a block diagram illustrating an alignment system according to at least one example embodiment.

FIG. 4 is a block diagram illustrating an alignment system 200 according to at least one example embodiment. The system 200 includes a fiber block 204, a lens block 208, an optical element 212, an alignment mechanism (or mechanism or alignment apparatus) 216, a mechanism 220, and a light source 224. The system 200 is for aligning the fiber block 204 with the lens block 208 and adhering the two elements together once in alignment. As noted above the fiber block 204 includes waveguides 206 that are desired to be aligned with corresponding lenses 214 on the lens block 208.

When the lens block 208 and the fiber block 204 are assembled as the collimator 218, each lens 214 may pass light to and/or from a corresponding waveguide 206 on the fiber block 204.

The optical element 212 may include a prism, a mirror, or other element that redirects light at a desired angle and/or passes filtered or unfiltered light. The optical element 212 is illustrated as being separate from the mechanism 220, but the optical element 212 may be integrated with the mechanism 220. For example, the mechanism 220 may include a holding device that holds the optical element 212 under the lens block 208. In at least one example embodiment, the optical element 212 is omitted or bypassed and light travels from the light source 224 directly to the mechanism 220.

The mechanism 216 includes suitable hardware and/or software and sub-mechanisms for accomplishing alignment between the fiber block 204 and the lens block 208. For example, the mechanism 216 may include holding device 230 to detachably hold the fiber block 204. The holding device 230 may include a vacuum device, clamp, or other suitable component for holding the fiber block 204 above the mechanism 220 and releasing the fiber block 204 when ready.

The mechanism 216 may be controlled automatically, manually, or a combination thereof. Automatic control may include the processing circuitry 246 or other computing device of the mechanism 216 executing pre-programmed instructions to move in a particular manner to align the fiber block 204 with the lens block 208. Manual control may include an operator inputting control signals to the mechanism 216 via an input device 232, such as a keyboard, touchscreen, mouse, joystick, buttons, and/or the like. The mechanism 216 may send and/or receive signals regarding a quality of the alignment between the fiber block 204 and the lens block 208.

The mechanism 216 may further include movement components 234 that enable the mechanism 216 or the holding device 230 that holds the fiber block 204 to move in all directions (e.g., x, y, and z directions and three angular directions). The movement components 234 may include any suitable mechanical components, electromechanical components, electrical components, and controls that enable movement in all directions.

In at least one example embodiment, the mechanism 216 includes one or more cameras 236 that provide moving and/or still images of the alignment process (e.g., close-up views of the fiber block 204 and lens block 208), and one or more displays 240 that display these moving and/or still images to the operator.

The mechanism 216 may include additional components suitable for adhering or otherwise fixing the fiber block 204 to the lens block 208 once proper alignment is achieved. For example, the mechanism 216 includes a movable applicator 244 for applying adhesive to the fiber block 204 and/or the lens block 208. In the event that the adhesive needs curing (e.g., UV curing or heat/infrared (IR) curing), the mechanism 216 may further include a device for curing (e.g., a UV light source or heat/IR source).

Although the input device 232, camera 236, display 240, and applicator 244 are shown as being included in the mechanism 216, it should be appreciated that one or more of these elements may be embodied in a device or devices separate from but in wired and/or wireless communication with the mechanism 216.

The mechanism 220 supports the lens block 208 and holds the lens block 208 in place with, for example, a clamp, a recess fitted for the lens block 208, or other suitable mechanism for detachably fixing the lens block 208 to the mechanism 220 during the alignment process. In at least one example embodiment, the mechanism includes a light transparent substrate (e.g., glass) on which the lens block 208 is mounted with the above-mentioned clamp. For example, the lens block 208 is mounted with the lenses 214 facing the transparent substrate so that curved portions of the lenses 214 receive light through the transparent substrate itself or through an opening in the transparent substrate. Although not explicitly shown, the mechanism 220 may further include the optical element 212 and light source 224. That is, the optical element 212 and the light source 224 may be integrated with the mechanism 220. In any event, the mechanism 220 may keep the lens block 208 stationary throughout the alignment process.

The light source 224 may emit light used during the alignment process. In at least one example embodiment, the light source 224 comprises one or more laser diodes configured to emit collimated light that the lens block 208 focuses into a plurality of light spots.

The processing circuitry 246 may include any suitable software and/or hardware for controlling elements of the mechanism 216 and/or other elements of the system 200. The processing circuitry 246 may be implemented in the same or similar manner as processing circuitry 132. The processing circuitry 246 may be in wired or wireless communication with the light source 224 and/or other illustrated and unillustrated elements of the system 200.

During an alignment stage or process, the fiber block 204 and the lens block 208 may be brought into coarse alignment by the mechanism 216. To assist with this process, the bottom of the fiber block 204 and/or the top of the lens block 208 may include one or more alignment marks or fiducials to assist with bringing the fiber block 204 and the lens block 208 into coarse alignment. A finer alignment process occurs after the coarse alignment process. In at least one example embodiment, the coarse alignment process is omitted in favor of only the fine alignment process. During the fine alignment process, the light source 224 is controlled to emit light, which can be modulated with data but is not necessary. The emitted light is directed by the optical element 212 to the mechanism 220 and then into the lens block 208. As noted above with reference to FIGS. 3B and 3C, the light incident to the lenses 214 of the lens block 208 produces a plurality of light spots at or near the surface 320 of the lens block 208 (the surface of the lens block 208 closest to the fiber block 204). The mechanism 216 is then controlled automatically and/or manually (e.g., with the assistance of the camera 236 and display 240) to move the fiber block 204 so that each waveguide 206 is optically coupled to one of the light spots. Alignment of each waveguide 206 a corresponding lens 214 may be visually confirmed by the operator when light appears in the waveguide 206 or at the end of the waveguide 206 not fixed in the fiber block 204.

It should be appreciated that the mechanism 216 may further include one or more components to alternatively or additionally confirm alignment between the waveguides 206 and the lenses 214. For example, the mechanism 216 may include a detector that includes one or more photoelectric conversion regions at the end of each waveguide 206 not fixed in the fiber block 204 to detect light that enters the fiber block 204 and passes to the detector. The photoelectric conversion region(s) may convert incident light into electric charge. The processing circuitry 246 may monitor or measure at least one property of light detected by the detector and determine a quality of alignment between a particular waveguide 206 and a corresponding lens 214. The light received by each waveguide 206 and passed to the detector is indicative of a quality of alignment between that waveguide 206 and a corresponding lens 214 because the one or more properties of light monitored at the detector change depending on how much light is incident to the detector compared to light output from the source 224.

For example, if the system 200 (e.g., the processing circuitry 246) is monitoring intensity of the optical signal fed through a waveguide 206 to the detector, then decreased signal intensity compared to the signal output from the source 224 may indicate poorer quality alignment while increased signal intensity may indicate a higher quality alignment. Other properties of light that may be measured or monitored by the detector or other device include signal power, power density, coherence, wavelength, spatial profile, temporal profile, and/or the like. Upon achieving a desired value or values for the one or more properties of light, which indicates that the fiber block 204 and the lens block 208 are aligned, the fiber block 204 is fixed to the lens block 208 with an adhesive or other suitable fixing material. The above-described alignment process may bring the divergence of the final collimator 218 within 0.0 to 0.2 degrees.

FIGS. 5A thru 5E illustrate various views of an example implementation of the system 200 from FIG. 4 according to at least one example embodiment.

Figure 5A:
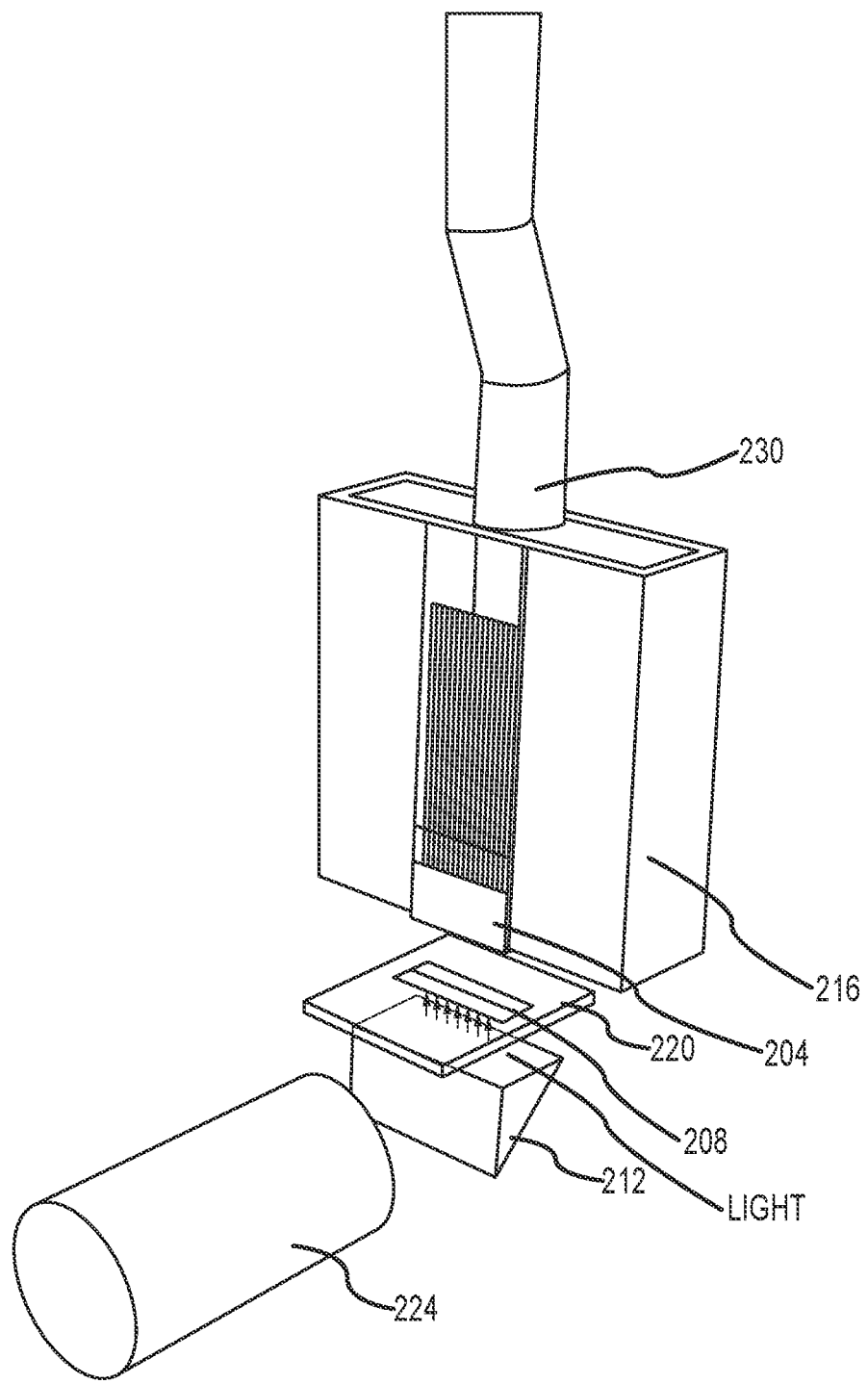

FIG. 5A illustrates a frontside perspective view of the system 200. During an alignment process, the light source 224 emits collimated light to the optical element 212. The optical element 212 may include a mirror or prism that redirects the light from the light source 224 to the mechanism 220, embodied in FIG. 5A as a transparent substrate. The redirected light passes through the transparent substrate into the lenses 214 of the lens block 208. As noted above, the light passing through lenses 214 produces a plurality of light spots at the surface 320 at or near the plane 316 of the lens block 208. The mechanism 216, which holds the fiber block 204 with holding device 230 (embodied in this case by a vacuum tube) is automatically and/or manually moved over the lens block 208 to optically couple the lenses 214 to the waveguides 206. An adhesive is applied to the lens block 208 and/or the fiber block 204 before the mechanism 216 moves the fiber block 204 into contact with the lens block 208 to adhere the two elements together to form a collimator 218. If needed, the adhesive is cured before the mechanisms 216 and 220 release the fiber block 204 and lens block 208, respectively, and the completed collimator 208 is withdrawn from the alignment system. As noted above, the mechanism 220, the optical element 212, and the light source 224 may be integrated into a single housing or structure instead of being embodied as discrete elements shown in FIG. 5A.

Figure 5B:
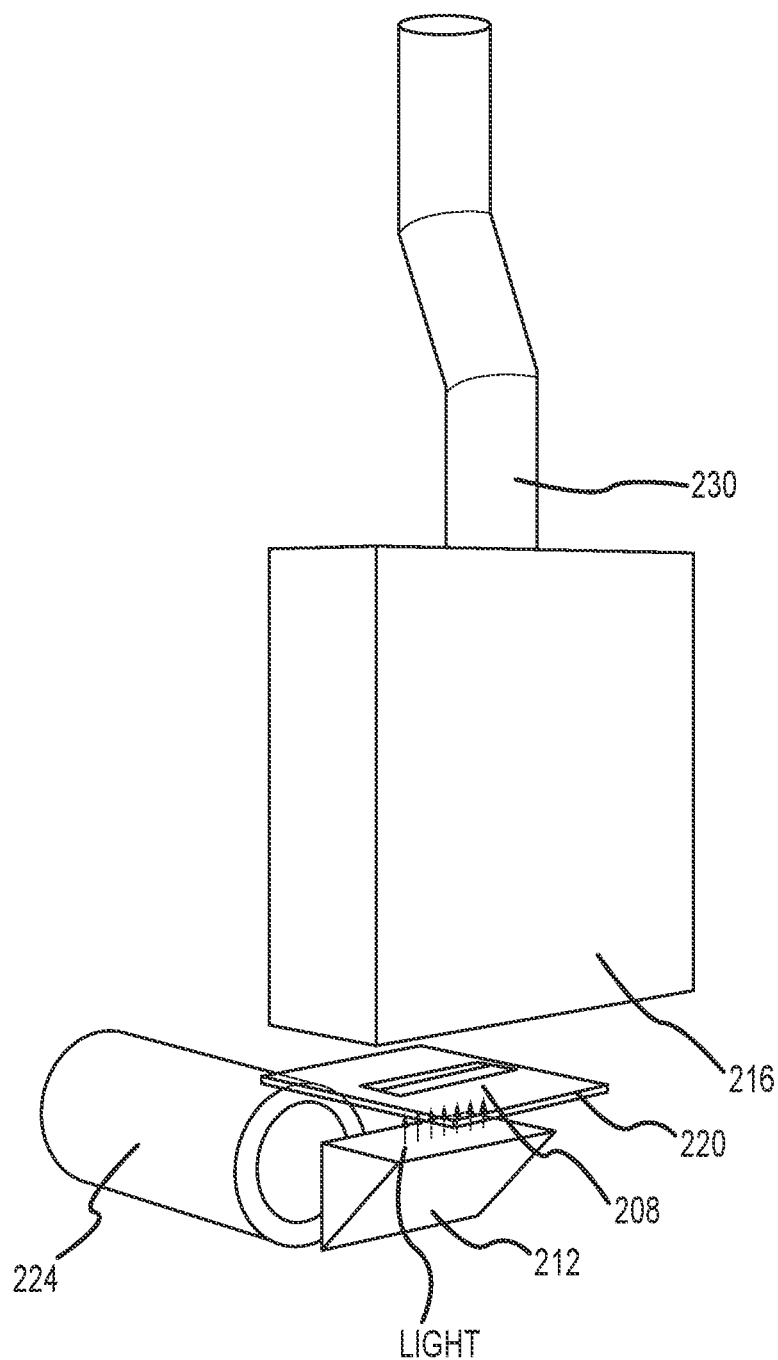

FIG. 5B illustrates a backside perspective view of the system 200 from FIG. 5A. In view of FIGS. 5A and 5B, it should be appreciated that the optical element 212 may have a triangular prism shape with substantially flat front and base surfaces and an angled back surface. In a case where the optical element is implemented with a mirror, the reflective portion of the optical element may be formed on the angled back surface of the optical element 212.

FIG. 5C illustrates a closeup view of the system 200 in FIG. 5A. As shown in FIG. 5C, the mechanism 220 is embodied by a transparent substrate and a clamping mechanism or clamp 500. As shown, the clamp 500 may include at least two parts, one part that contacts one side of the lens block 208 and another part that contacts an opposite side of the lens block 208. The clamp 500 holds the lens block 208 in place during the alignment process. However, example embodiments are not limited to a clamp, and any suitable means for holding the lens block 208 stationary may be used. For example, the transparent substrate may include a groove or recess fitted for the lens block 208 that limits movement of the lens block 208.

Figure 5D:
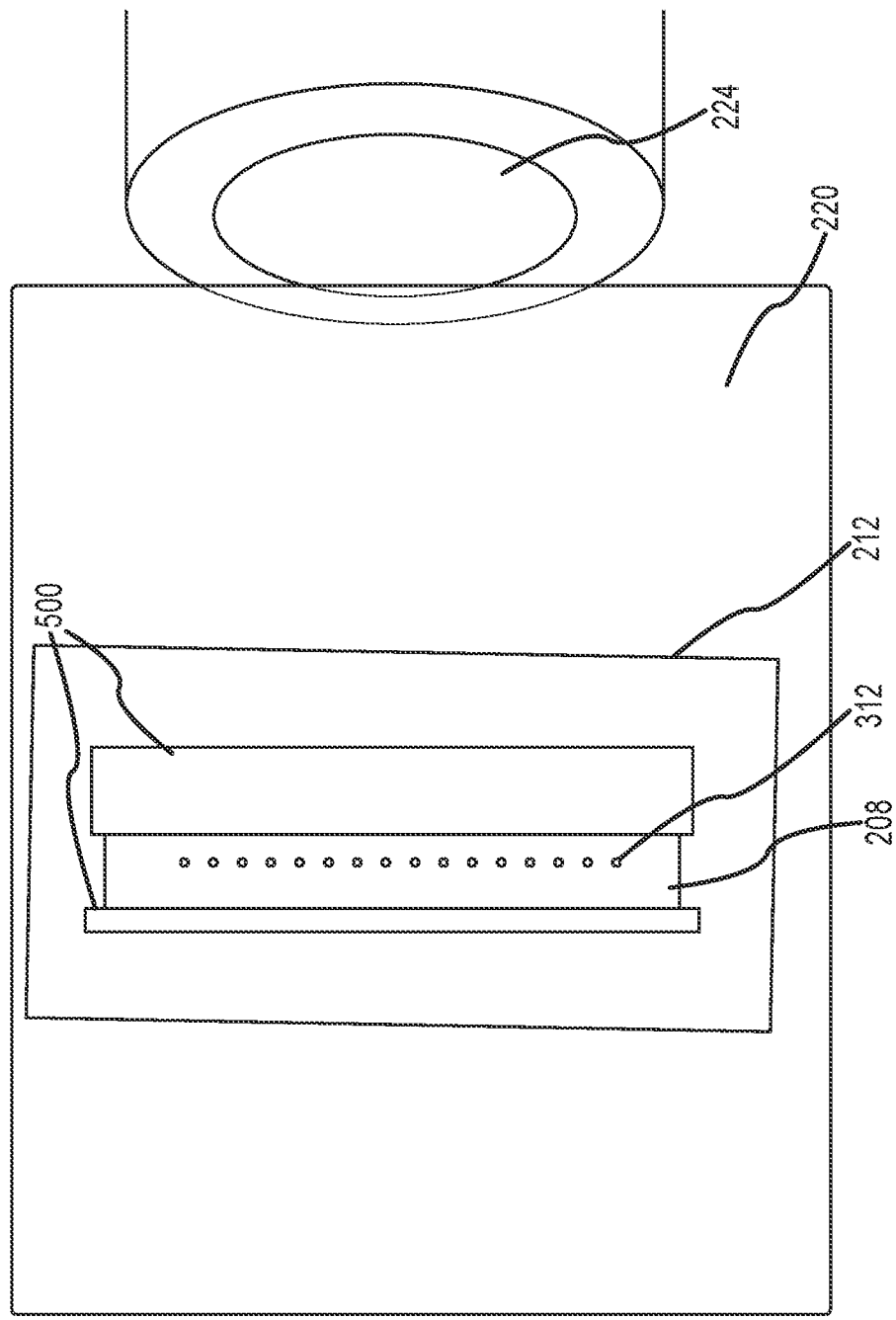

FIG. 5D illustrates a closeup plan view of the mechanism 220 to further illustrate the plurality of light spots 312 that exist at the plane 316 near the surface 320 of the lens block 208.

Figure 5E:
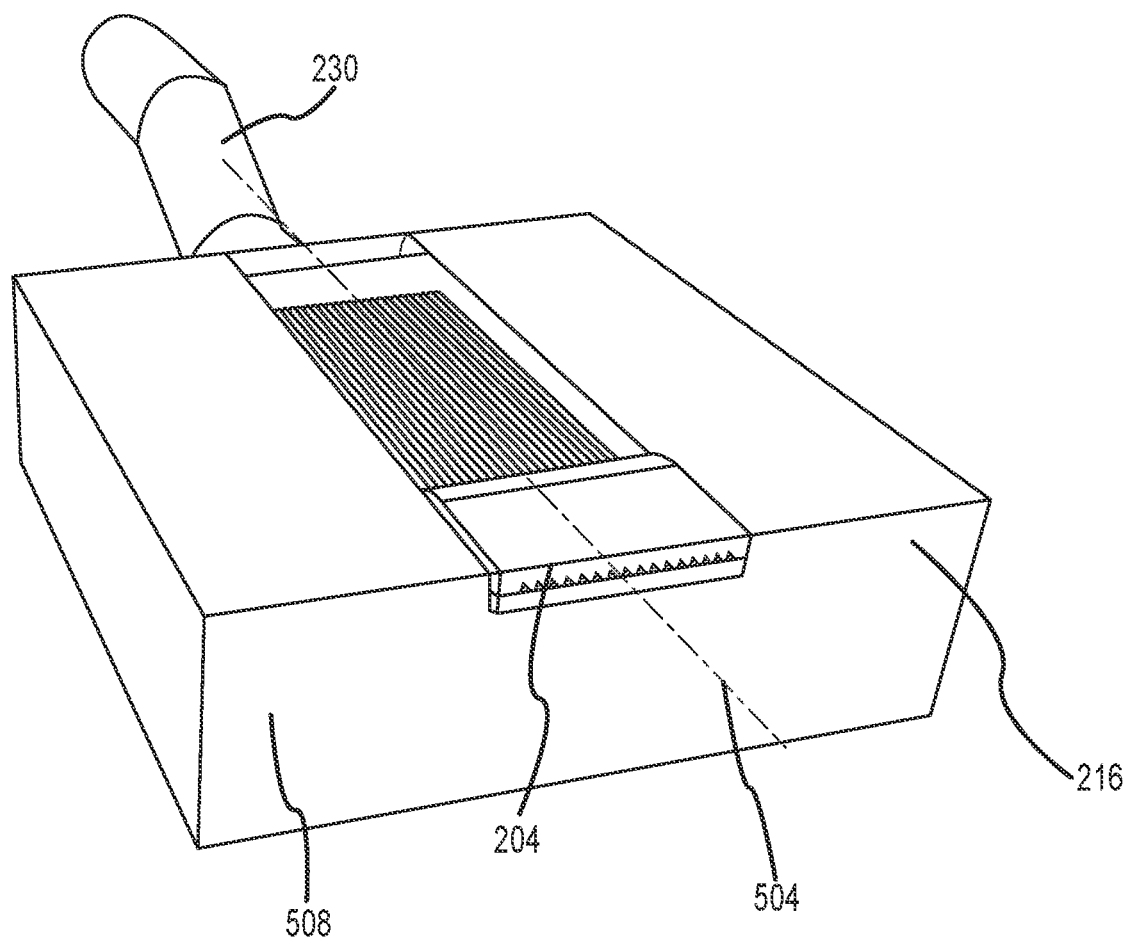

FIG. 5E illustrates a bottom perspective view of the mechanism 216. As shown in FIG. 5E, a center of the vacuum tube embodying the holding device 230 that limits vertical movement of the fiber block 204 is aligned with a center longitudinal axis 504 of the fiber block 204. As further illustrated in FIG. 5E, a housing 508 of the mechanism 216 may serve as or include a clamp to limit lateral movement of the fiber block 204 during alignment.

Figure 6:
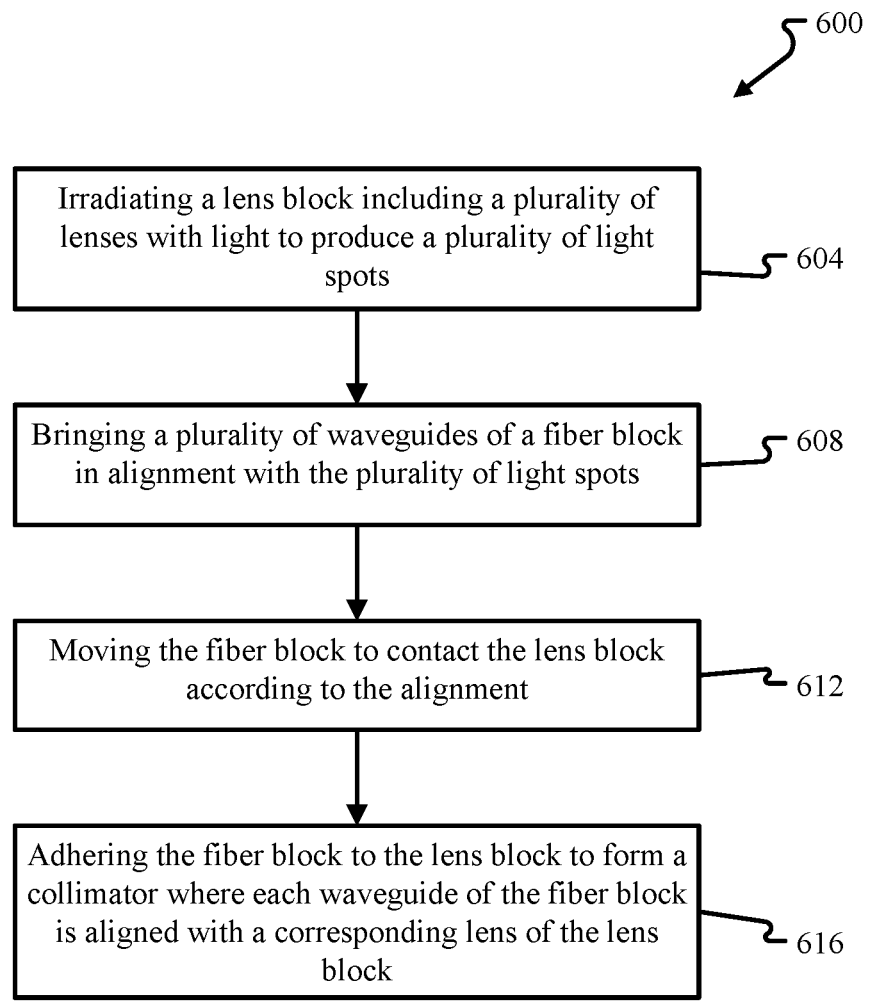
FIG. 6 illustrates a method according to at least one example embodiment.

FIG. 6 illustrates a method 600 according to at least one example embodiment. The method 600 relates to an alignment process between a fiber block 204 and a lens block 208 as described above. Thus, the operations of the method 600 are carried out by various elements of the system 200 described above.

Operation 604 includes irradiating a lens block 208 including a plurality of lenses 214 with light to produce a plurality of light spots 312. The light may be collimated light from light source 224.

Operation 608 includes bringing a plurality of waveguides 206 of a fiber block 204 in alignment with the plurality of light spots 312. For example, the mechanism 216 moves the fiber block 204 with the waveguides 206 over the lens block 208 until a perimeter of each waveguide 206 hovers over a respective light spot. That is, bringing the plurality of waveguides 206 in alignment with the plurality of light spots 312 includes aligning each light spot 312 with a center of a corresponding waveguide 206. The alignment of each light spot 312 with a center of a corresponding waveguide 206 may be confirmed according to one or more of the methods described above and/or by an operating performing the alignment having a visual of the alignment aided by a camera and a display.

Operation 612 includes moving the fiber block 204 to contact the lens block 208 according to the alignment. Moving the fiber block 204 to contact the lens block 208 may include depositing an adhesive on the lens block 208 before the fiber block 204 contacts the lens block 208. Depositing the adhesive may occur before or after the waveguides 206 are determined to be aligned with the lenses 214, and the adhesive may be applied to the fiber block 204 and/or the lens block 208.

Operation 616 includes adhering the fiber block 204 to the lens block 208 to form a collimator 218 where each waveguide 206 of the fiber block 204 is aligned with (i.e., optically coupled with) a corresponding lens 214 of the lens block 208. For example, operation 616 includes curing the adhesive applied to the fiber block 204 and/or lens block 208 via ultraviolet curing, catalytic curing, or other curing depending on the type of adhesive used. Thereafter, a completed collimator 218 is formed.

In view of FIGS. 1-7, it may be said that a system 200 includes a first mechanism 220 configured to hold a first block 208 including a plurality of lenses 214 located on or near a first surface 300 of the first block 208, where the plurality of lenses 214 are configured to receive light to generate a plurality of light spots 312 at or near a second surface 320 of the first block 208 opposite the first surface 300. The system 200 further includes a second mechanism 216 configured to hold a second block 204 including a plurality of waveguides 206, and to move the second block 204 to bring the plurality of waveguides 206 in alignment with the plurality of lenses 214 using the plurality of light spots 312 as alignment marks. As noted above, the first mechanism 220 includes a light transparent substrate and a clamping mechanism 500 to hold the first block 208 on the transparent substrate. The clamping mechanism 500 is configured to hold the first block 208 with the plurality of lenses 214 facing the light transparent substrate. The system 200 further includes a light source 224 configured to emit the light through the transparent substrate to the plurality of lenses 214. The system 200 may also include at least one optical element 212 in an optical path between the light source 224 and the light transparent substrate. The at least one optical element 212 is configured to direct light emitted from the light source 224 toward the light transparent substrate. As noted above, at least one optical element 212 comprises a prism or mirror.

The system 200 may further includes a third mechanism embodied by applicator 244 configured to apply an adhesive to the second surface 320 of the first block 208. Then, the second mechanism 216 is configured to move the second block 204 into contact with the first block 208 to adhere the second block 204 to the first block 208 with the adhesive. As further noted above, the second mechanism 216 includes a first device (e.g., a vacuum) configured to limit vertical movement of the second block 204, and a second device (e.g., a clamp, housing, or other holding mechanism) configured to limit lateral movement of the second block 204.

In at least one embodiment, the plurality of lenses 214 have a substantially same focal length so that the plurality of light spots 312 exist at a substantially same plane 316 that is substantially parallel to the second surface 320 the first block 208. The substantially same plane 316 may be spaced apart from the second surface 320 of the first block 308.

Said another way, example embodiments provide a system 200 that includes a transparent substrate 220 configured to hold a lens block 208 including a plurality of lenses 214 located at a first surface 300 of the lens block 208. The system 200 includes a light source 224 configured to emit collimated light that causes the lens block 208 to produce a plurality of light spots 312 at a second surface 320 of the lens block 208 opposite the first surface 300. The system further includes a fiber block 204 including a plurality of waveguides 206, and an alignment apparatus 216 configured to align the plurality of waveguides 206 with the plurality of lenses 14 using the plurality of light spots 312. The system further includes an optical element 212 configured to direct the collimated light received from the light source 224 toward the first surface 300 of the lens block 208. The alignment apparatus 216 is configured to move the fiber block 204 to align each light spot 312 with a first end of a corresponding waveguide 206, to determine that each lens 312 is aligned with the corresponding waveguide 206 when the light spot 312 appears at a second end of the corresponding waveguide 206, to apply an adhesive to the lens block 208, and to bring the fiber block 204 in contact with the lens block 208 to adhere the fiber block 204 to the lens block 208.

In view of the above, it should be appreciated that at least one example embodiment is directed to a system including a first mechanism 220 including a lens block 208 configured to produce a plurality of light spots 312 based on incident light, and a second mechanism 216 configured to align a fiber block 204 with the lens block 208 using at least some of the plurality of light spots 312.

Here, it should be appreciated that example embodiments have been shown and described with respect to a scenario where the mechanism 216 holds and moves the fiber block 204 relative to the lens block 208. However, inventive concepts are not limited thereto. In at least one example embodiment, roles of the lens block 208 and the fiber block 204 may be reversed such that the lens block 208 is releasably attached to the mechanism 216 and the fiber block 204 is held in place. In this case, the mechanism 216 holds and moves the mechanism 220 including the lens block 208 (where the mechanism 220 may also include the light source 224 and/or optical element 212) relative to the fiber block 204 fixed on its own mechanism. So long as the light source 224 is able to pass light through the lenses 214 to produce light spots, these light spots may be used as alignment marks in the same manner as described above to move the lens block 208 into alignment with the stationary fiber block 204.

In view of the foregoing, it should be appreciated that inventive concepts relate to, among other things, an optical alignment process and optical device formed according to the alignment process. As a result, the alignment process between a lens block and a fiber block may be performed quickly and accurately.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

Example embodiments may be configured according to the following:

(1) A system, comprising:

a first mechanism configured to hold a first block including a plurality of lenses located on or near a first surface of the first block, the plurality of lenses being configured to receive light to generate a plurality of light spots at or near a second surface of the first block opposite the first surface; and a second mechanism configured to:
  hold a second block including a plurality of waveguides; and
  move the second block to bring the plurality of waveguides in alignment with the plurality of lenses using the plurality of light spots as alignment marks.

(2) The system of (1), wherein the first mechanism includes a light transparent substrate and a clamping mechanism to hold the first block on the transparent substrate.

(3) The system of one or more of (1) to (2), wherein the clamping mechanism is configured to hold the first block with the plurality of lenses facing the light transparent substrate.

(4) The system of one or more of (1) to (3), further comprising:
  a light source configured to emit the light through the transparent substrate to the plurality of lenses.

(5) The system of one or more of (1) to (4), further comprising:
  at least one optical element in an optical path between the light source and the light transparent substrate.

(6) The system of one or more of (1) to (5), wherein the at least one optical element is configured to direct light emitted from the light source toward the light transparent substrate.

(7) The system of one or more of (1) to (6), wherein the at least one optical element comprises a prism or mirror.

(8) The system of one or more of (1) to (7), further comprising:
  a third mechanism configured to apply an adhesive to the second surface of the first block, and wherein the second mechanism is configured to move the second block into contact with the first block to adhere the second block to the first block with the adhesive.

(9) The system of one or more of (1) to (8), wherein the second mechanism includes a first device configured to limit vertical movement of the second block, and a second device configured to limit lateral movement of the second block.

(10) The system of one or more of (1) to (9), wherein the first device comprises a vacuum.

(11) The system of one or more of (1) to (10), wherein the second device comprises a holding mechanism.

(12) The system of one or more of (1) to (11), wherein the plurality of lenses have a substantially same focal length so that the plurality of light spots exist at a substantially same plane that is substantially parallel to the second surface the first block.

(13) The system of one or more of (1) to (12), wherein the substantially same plane is spaced apart from the second surface of the first block.

(14) A method, comprising:
  irradiating a lens block including a plurality of lenses with light to produce a plurality of light spots;
  bringing a plurality of waveguides of a fiber block in alignment with the plurality of light spots;
  moving the fiber block to contact the lens block according to the alignment; and
  adhering the fiber block to the lens block to form a collimator where each waveguide of the fiber block is aligned with a corresponding lens of the lens block.

(15) The method of (14), wherein bringing the plurality of waveguides in alignment with the plurality of light spots includes aligning each light spot with a center of a corresponding waveguide.

(16) The method of one or more of (14) to (15), wherein moving the fiber block to contact the lens block includes depositing an adhesive on the lens block, and wherein adhering the fiber block to the lens block includes curing the adhesive with ultraviolet light.

(17) The method of one or more of (14) to (16), wherein each of the plurality of lenses have a substantially same focal length so that the plurality of light spots exist at a substantially same plane that is substantially parallel to a surface the lens block.

(18) The method of one or more of (14) to (17), wherein the light is collimated light.

(19) A system, comprising:
  a transparent substrate configured to hold a lens block including a plurality of lenses located at a first surface of the lens block;
  a light source configured to emit collimated light that causes the lens block to produce a plurality of light spots at a second surface of the lens block opposite the first surface;
  a fiber block including a plurality of waveguides; and
  an alignment apparatus configured to align the plurality of waveguides with the plurality of lenses using the plurality of light spots.

(20) The system of (19), further comprising:
  an optical element configured to direct the collimated light received from the light source toward the first surface of the lens block, wherein the alignment apparatus is configured to move the fiber block to align each light spot with a first end of a corresponding waveguide, to determine that each lens is aligned with the corresponding waveguide when the light spot appears at a second end of the corresponding waveguide, to apply an adhesive to the lens block, and to bring the fiber block in contact with the lens block to adhere the fiber block to the lens block.

(21) A system comprising:
  a first mechanism including a lens block configured to produce a plurality of light spots based on incident light; and
  a second mechanism configured to align a fiber block with the lens block using at least some of the plurality of light spots.

What is claimed is:

1. A system, comprising:
  a first mechanism configured to hold a first block including a plurality of lenses located on or near a first surface of the first block, the plurality of lenses being configured to receive light to generate a plurality of light spots at or near a second surface of the first block opposite the first surface; and
  a second mechanism configured to:
    hold a second block including a plurality of waveguides; and
    move the second block to bring the plurality of waveguides in alignment with the plurality of lenses using the plurality of light spots as alignment marks.

2. The system of claim 1, wherein the first mechanism includes a light transparent substrate and a clamping mechanism to hold the first block on the light transparent substrate.

3. The system of claim 2, wherein the clamping mechanism is configured to hold the first block with the plurality of lenses facing the light transparent substrate.

4. The system of claim 3, further comprising:
  a light source configured to emit the light through the light transparent substrate to the plurality of lenses.

5. The system of claim 4, further comprising:
  at least one optical element in an optical path between the light source and the light transparent substrate.

6. The system of claim 5, wherein the at least one optical element is configured to direct light emitted from the light source toward the light transparent substrate.

7. The system of claim 6, wherein the at least one optical element comprises a prism or mirror.

8. The system of claim 1, further comprising:
a third mechanism configured to apply an adhesive to the second surface of the first block, and wherein the second mechanism is configured to move the second block into contact with the first block to adhere the second block to the first block with the adhesive.

9. The system of claim 1, wherein the second mechanism includes a first device configured to limit vertical movement of the second block, and a second device configured to limit lateral movement of the second block.

10. The system of claim 9, wherein the first device comprises a vacuum.

11. The system of claim 10, wherein the second device comprises a holding mechanism.

12. The system of claim 1, wherein the plurality of lenses have a substantially same focal length so that the plurality of light spots exist at a substantially same plane that is substantially parallel to the second surface the first block.

13. The system of claim 12, wherein the substantially same plane is spaced apart from the second surface of the first block.

14. A method, comprising:
irradiating a lens block including a plurality of lenses with light to produce a plurality of light spots;
bringing a plurality of waveguides of a fiber block in alignment with the plurality of light spots;
moving the fiber block to contact the lens block according to the alignment; and
adhering the fiber block to the lens block to form a collimator where each waveguide of the fiber block is aligned with a corresponding lens of the lens block.

15. The method of claim 14, wherein bringing the plurality of waveguides in alignment with the plurality of light spots includes aligning each light spot with a center of a corresponding waveguide.

16. The method of claim 14, wherein moving the fiber block to contact the lens block includes depositing an adhesive on the lens block, and wherein adhering the fiber block to the lens block includes curing the adhesive with ultraviolet light.

17. The method of claim 14, wherein each of the plurality of lenses have a substantially same focal length so that the plurality of light spots exist at a substantially same plane that is substantially parallel to a surface the lens block.

18. The method of claim 14, wherein the light is collimated light.

19. A system, comprising:
a transparent substrate configured to hold a lens block including a plurality of lenses located at a first surface of the lens block;
a light source configured to emit collimated light that causes the lens block to produce a plurality of light spots at a second surface of the lens block opposite the first surface;
a fiber block including a plurality of waveguides; and
an alignment apparatus configured to align the plurality of waveguides with the plurality of lenses using the plurality of light spots.

20. The system of claim 19, further comprising:
an optical element configured to direct the collimated light received from the light source toward the first surface of the lens block, wherein the alignment apparatus is configured to move the fiber block to align each light spot with a first end of a corresponding waveguide, to determine that each lens is aligned with the corresponding waveguide when the light spot appears at a second end of the corresponding waveguide, to apply an adhesive to the lens block, and to bring the fiber block in contact with the lens block to adhere the fiber block to the lens block.

21. A system, comprising:
a first mechanism including a lens block configured to produce a plurality of light spots based on incident light; and
a second mechanism configured to align a fiber block with the lens block using at least some of the plurality of light spots.

* * * * *